July 21, 1959  E. E. SAVARD  2,895,690
GUIDE FOR ARMATURE WINDING
Filed July 3, 1956  2 Sheets-Sheet 1
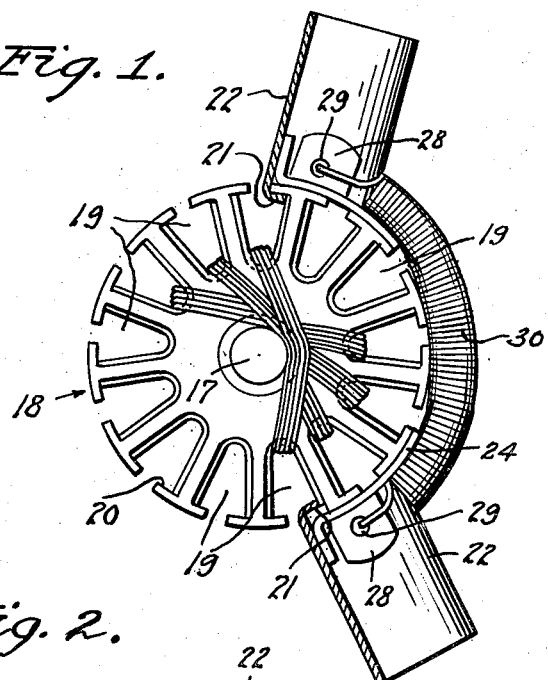
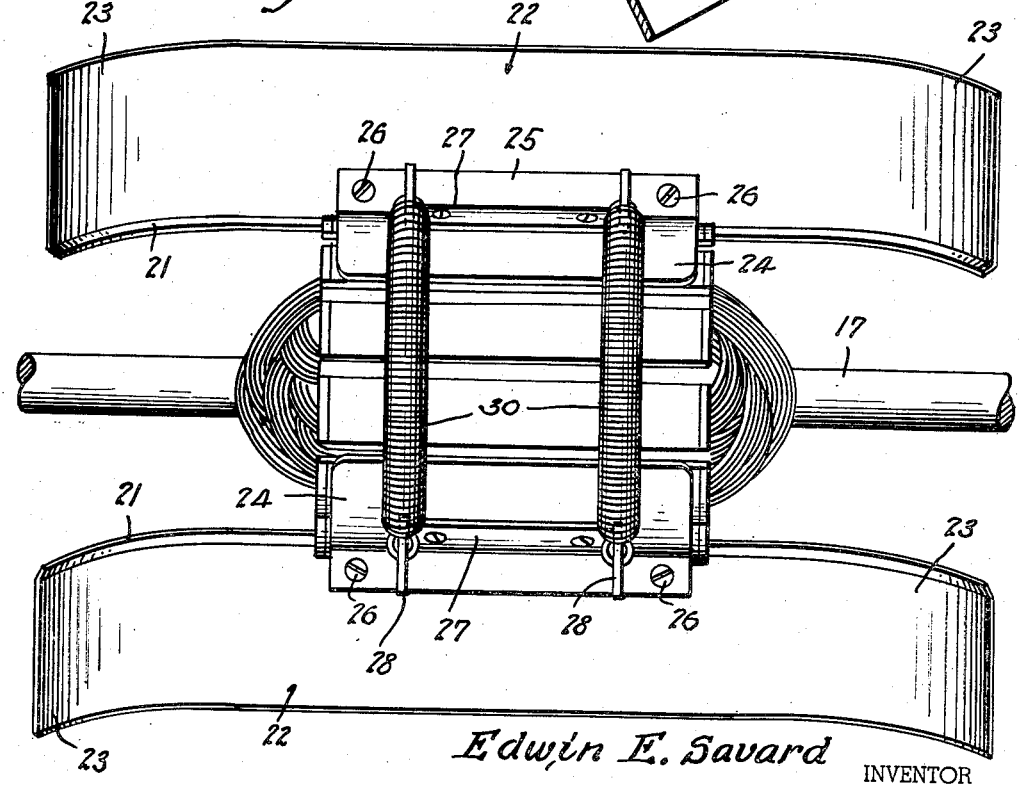
Edwin E. Savard
INVENTOR
BY  *CA Snow & Co.*
ATTORNEYS.

July 21, 1959
E. E. SAVARD
2,895,690
GUIDE FOR ARMATURE WINDING
Filed July 3, 1956
2 Sheets-Sheet 2
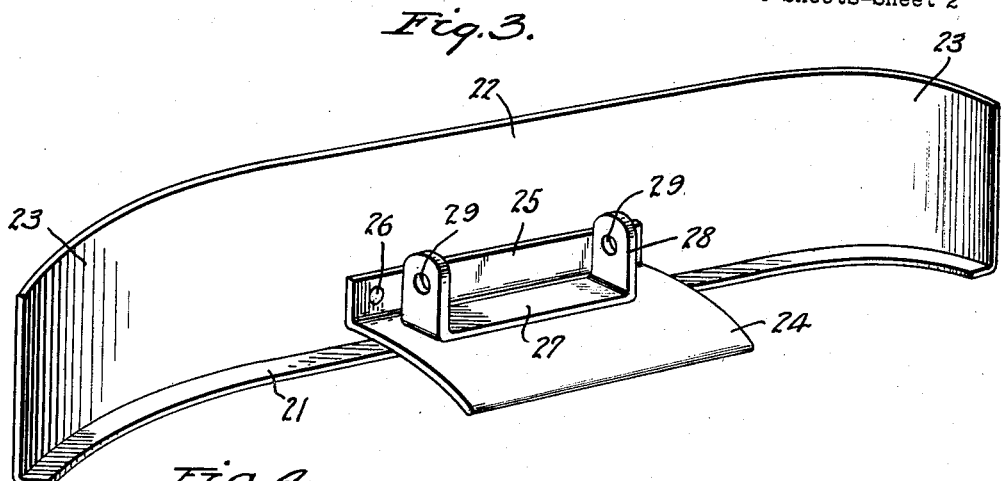
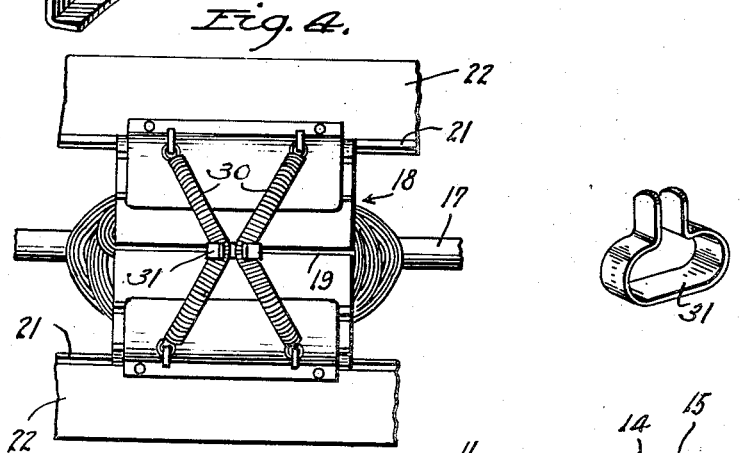
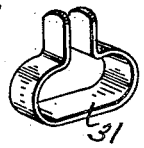
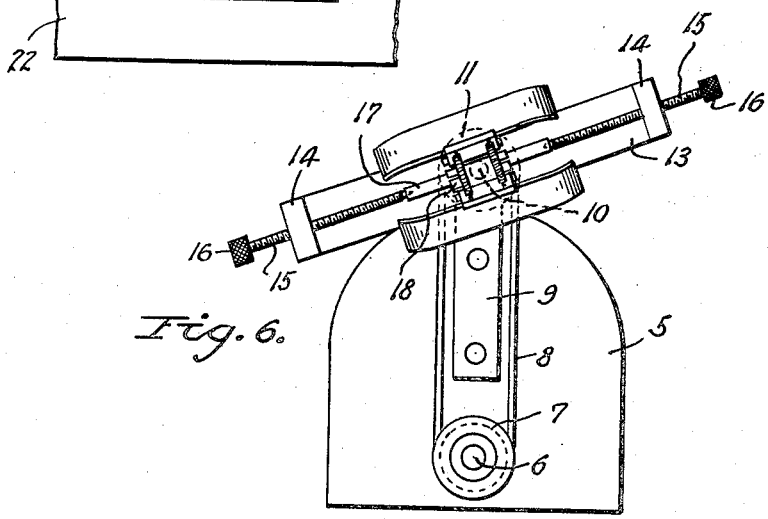
Edwin E. Savard
INVENTOR
BY *Snow & Snow*
ATTORNEYS.

United States Patent Office 2,895,690
Patented July 21, 1959

2,895,690

GUIDE FOR ARMATURE WINDING

Edwin E. Savard, Ventura, Calif.

Application July 3, 1956, Serial No. 595,631

1 Claim. (Cl. 242—13)

This invention relates to an apparatus for winding armatures, the primary object of the invention being to provide mechanism for mechanically guiding the armature wire into the slots of the armature during the winding operation of the wire on the armature core.

An important object of the invention is to provide guide blades secured to an armature core mounted on a power driven winding head in such a way that when the driving head is rotated, the wire will be directed over the guide blades and guided into the slots of the armature insuring a true and accurate winding of the armature.

Another object of the invention is to provide a mechanism which may be readily mounted on a power driven winding head used in winding armature, which will eliminate the necessity of the operator guiding the winding wire into slots of the armature in winding armatures, thereby increasing the speed and insuring accuracy in the winding of armatures, with the resultant reduction in the cost of armature production.

Still another object of the invention is to provide a wire guide attachment adapted to be mounted on an armature for guiding the armature winding or wire to the wire slots during the winding of the armature, the attachment being adjustable so that the guide may be mounted on armatures of various sizes.

Other and further objects and advantages of the invention will be hereinafter described and the novel features thereof defined in the appended claim.

Referring to the drawings:

Fig. 1 is an end view of an armature on which the wire guiding blades are attached for guiding the armature winding wire to the slots of the armature.

Fig. 2 is a plan view thereof.

Fig. 3 is a perspective view of one of the guiding blades.

Fig. 4 is a plan view of the attachment mounted on an armature for guiding the armature wire to the slots of the armature, the view illustrating means for tensioning the springs which yieldably connect the blades to the armature.

Fig. 5 is a perspective view of the device used for increasing the tension of the coiled springs of the attachment.

Fig. 6 is an elevational view illustrating a winding head with an armature mounted thereon for receiving the winding wire of the armature.

Referring to the drawings in detail, the apparatus forming the subject matter of the present invention is designed primarily in winding the armatures used in the construction of small electric tools, eliminating the necessity of manually guiding the winding wire through the slots of the armature, which is a slow and tedious operation, under normal conditions.

In the present showing, the reference character 5 indicates a reduction gear housing, the gearing being operated by an electric motor mounted at one side of the gear housing.

The reference character 6 indicates the power shaft that extends through one wall of the reduction gear housing 5 as better shown by Fig. 6 of the drawings, where it is provided with a pulley 7 over which the belt 8 operates.

The reference character 9 indicates a supporting arm that is secured to the outer surface of one wall of the reduction gear housing 5, the upper end of the supporting arm extending above the upper edge of the gear housing 5.

At the upper end of the supporting arm 9 is a bearing in which a shaft 10 operates, the shaft 10 supporting a pulley 11 over which the belt 8 operates, the belt 8 transmitting rotary motion from the pulley 7, to the pulley 11 for rotating the power driven winding head.

The winding head includes a bar 13 that has its ends extended laterally at 14 where they are provided with threaded openings to receive the set screws 15 formed with knurled heads 16. These set screws 15 have pointed inner ends that fit into recesses formed in the ends of the shaft 17, on which the armature 18 is mounted to rotate therewith. Thus it will be seen that due to this construction the armature being wound is securely held between the set screws 15 at opposite ends of the bar 13 for rotation in winding the wire on the armature.

The armature which is indicated by the reference character 18 of the usual construction, and is provided with the usual slots 19 that are so constructed that inwardly extended flanges 20 are provided at the outer ends of the slots. These flanges 20 are engaged by the flanges 21 of the guide blades 22 which are shown in Fig. 1 of the drawings, as resting against the flanges 20, holding the guide blades in position on the armature to be wound.

As shown by Fig. 2 of the drawings, the blades 22 are of such thickness that when they are positioned in a slot of the armature, there will be sufficient clearance for the winding wire to pass into the slots.

These guide blades 22 are of length so that the ends thereof will extend substantial distances beyond the ends of the armature being wound, the extended ends of the guide blades which are indicated by the reference character 23, being curved rearwardly so that the wire will contact the curved portions of the blades and cause the wire to move along the substantially straight or central portions of the blades to pass into the slots of the armature.

Secured to each blade 22 is a plate 24, the plates having their inner ends extended laterally providing a securing flange 25 that is secured to the rear surface of the blade on which it is mounted, by means of rivets indicated by the reference character 26.

Secured to the outer surfaces of the plates 24, are brackets 27 that have right angled end portions 28 formed with openings 29 which openings accommodate the ends of coiled springs 30 that connect between adjacent blades 22 normally biasing the blades towards each other and securing the guide blades in position against displacement as the winding head is rotated in winding the wire thereon during the construction of the armature.

Although the attachment is designed primarily for exceptionally small armatures, it frequently happens that the tension of the springs 30 is insufficient for causing the proper clamping relation between the blades 22 and armature. In this case a clip such as shown in Fig. 5 of the drawings and indicated by the reference character 31 is clipped over the central portions of the coiled springs 30 as shown by Fig. 4 of the drawings, thereby increasing the tension of the springs to cause them to draw the blades 22 towards each other with such force as to firmly grip the armature being wound.

In the operation of the device, a pair of guide blades 22 are positioned at substantially opposite points on the armature as shown by Fig. 1 of the drawings, whereupon the wire to be wound on the armature is positioned and two loops of the wire are formed by passing the wire into the proper slots of the armature.

The gearing may now be set in motion causing the wire driven winding head to rotate in a vertical plane, at approximately 110 revolutions per minute. The wire to be wound on the armature is allowed to pass through the hand of the operator in the taut condition with the result that during the rotation of the driving head, the wire will be moved over the curved surfaces of the guide blades and move into the proper slots. This being an automatic operation, it will be obvious that the wire will fall into the proper slots for the correct winding of the armature.

After the required number of loops or turns of the wire are properly located within the slots the blades are easily transferred to the adjacent slots whereupon the rotation of the driving head is continued and these slots are supplied with the required numbers of loops or wire. This operation is repeated until all of the slots of the armature have been supplied with the wires making a complete armature.

Should it be desired to use the guide blades on an armature of less diameter, it is only necessary to position the guide blades in a manner as described, and increase the tension of the coiled springs 30, by positioning the clip 31 over the central portions of the coiled springs as shown by Fig. 4 of the drawings, drawing the central portions of the springs together providing a tight and yieldable connection between the guide blades and armature.

Having thus described the invention what is claimed is:

In a guide attachment for guiding the wire of an armature winding into the slots of an armature core, mounted on an armature winding head, the core having flanges extending laterally from the longitudinal edges of said slots, comprising guide blades having rearwardly curved ends disposed longitudinally of said core adjacent to the slots of said core, a flange extending laterally from one longitudinal edge of each blade adapted to be positioned within a slot of the armature core in contact with a flange extending from said core, securing plates fixed to said guide blades, brackets having extending ears fixed to said securing plates, spaced parallel coiled springs secured between the ears of said brackets and stretched between said blades normally biasing said blades towards each other holding said flanges of the blades within the slots of said armature core guiding the armature wire into said slots while being wound on the core, and clips secured between said spaced parallel springs for tensioning said springs.

References Cited in the file of this patent

UNITED STATES PATENTS

| 831,740 | Oswald | Sept. 25, 1906 |
| 2,535,438 | McCollom | Dec. 26, 1950 |

FOREIGN PATENTS

| 888,579 | Germany | Sept. 3, 1953 |